United States Patent [19]

Dacey, Jr.

[11] Patent Number: 4,760,633
[45] Date of Patent: Aug. 2, 1988

[54] METHOD FOR BODY PANEL ATTACHMENT

[75] Inventor: Ernest A. Dacey, Jr., Highland, Mich.

[73] Assignee: Utica Enterprises, Inc., Sterling Heights, Mich.

[21] Appl. No.: 106,957

[22] Filed: Oct. 14, 1987

Related U.S. Application Data

[63] Continuation of Ser. No. 810,045, Dec. 17, 1985, abandoned.

[51] Int. Cl.⁴ .............................................. B23P 11/00
[52] U.S. Cl. ....................................... 29/432.1; 72/334
[58] Field of Search ...................... 29/432.1, 428, 432, 29/406; 72/334, 350; 296/191, 31 P, 526 R

[56] References Cited

U.S. PATENT DOCUMENTS

| | | | |
|---|---|---|---|
| 1,048,046 | 12/1912 | Currey | 72/334 |
| 1,699,361 | 1/1929 | Karmazin | 72/334 |
| 3,494,169 | 2/1970 | Saunders | 72/350 |
| 4,070,895 | 1/1978 | Yamada et al. | 72/334 |
| 4,489,584 | 12/1984 | Gall et al. | 72/350 |
| 4,580,431 | 4/1986 | Oku et al. | 72/334 |
| 4,590,780 | 5/1986 | Bachmann | 72/334 |
| 4,599,885 | 7/1986 | Stone | 72/350 |

Primary Examiner—Howard N. Goldberg
Assistant Examiner—Irene Cuda
Attorney, Agent, or Firm—Remy J. VanOphem

[57] ABSTRACT

A pad forming device for forming attachment pads in an automotive inner body panel element to provide for the attachment of an outer body panel to the inner body panel. The outer body panel must be attached at a precise location and the inner body panel element is not as precisely positioned. The device has one or more fixed anvils which are positioned at a predetermined position adjacent to, but spaced from, the inner body panel element, the magnitude of such spacing varying with the position of the inner body panel element. Movable floating locators that are disposed on opposite sides of each fixed anvil are advanced toward the inner body panel element until they make contact therewith, at which time the floating locators are locked in a fixed position. A load is then imposed on the other side of the inner body panel element by pad forming blocks located in alignment with each fixed anvil to deform the portion between the fixed anvil and the pad forming block against the fixed anvil to thereby form an attachment pad, the height depth of the pad varying from the original position of the inner body panel element. The fixed anvil is configured to provide a reciprocating punching tool which reciprocates through the fixed anvil to lance, punch or pierce the pad, after it has been formed against the anvil to enable the precise attachment of an outer body panel to an attachment pad.

7 Claims, 4 Drawing Sheets

METHOD FOR BODY PANEL ATTACHMENT

This is a continuation of application Ser. No. 810,045, filed Dec. 17, 1985, now abandoned.

BACKGROUND OF THE INVENTION

1. Field of the Invention

This invention relates to the attachment, at a precise position, of a first member to a second member which is not as precisely positioned as the first member, and provides a method of and apparatus for locating the position of the first member and for reforming the second member by a variable magnitude depending on the actual position of the second member relative to a predetermined position. The invention relates, in particular, to the precise attachment of an outer body panel member of an automotive vehicle to an imprecisely located element of an inner body panel structure.

2. Description of the Prior Art

U.S. Pat. No. 4,438,971 (W. S. Zaydel, et al) describes a method of and apparatus for attaching, at a precise location, a plastic automotive body panel to a relatively imprecisely located element of an inner body panel structure. According to the teachings of this patent, plastic-filled metal attachment blocks or pads are welded at selected locations to the inner body panel structure. The inner body panel structure is then positioned within a locating and machining fixture and each of the plastic-filled attachment blocks is milled to a precise position, the distance between the inner body panel structure and the milled face of the plastic-filled attachment blocks varying with the position of the inner body panel structure. The plastic outer body panel member is then attached to the milled face of the plastic-filled attachment block, after drilling a hole in the plastic-filled attachment block to receive a threaded fastener or a fastener attached to the inside of the plastic outer body panel member. By this method and apparatus, each such plastic outer body panel member is mounted in a precisely determined and in precise surface alignment with each adjacent plastic panel.

The method and apparatus of the aforesaid U.S. Pat. No. 4,438,971 does lead to precision in the positioning of plastic outer body panels to a relatively imprecisely positioned automotive inner body panel structure, but it requires the initial attachment of the plastic-filled attachment blocks to the inner body panel structure, a factor which adds to the material and processing costs of producing an automotive body in this manner, and the welding operation that is needed to attach the plastic-filled metal attachment blocks is noisy and dirty. Additionally, the subsequent milling of the plastic-filled attachment blocks generates scrap which is a mixture of a metal and the plastic filler material which, for the disposition of such scrap in an environmentally acceptable manner, involves additional expense and, in any case, the milling of the plastic-filled attachment blocks generates dust corresponding, mainly, to the composition of the plastic filler. This is also objectionable on environmental and workplace health and safety grounds, unless strict precautions are followed in performing the milling and drilling of the plastic-filled attachment blocks.

It is also known in the prior art that a relatively imprecisely located automotive inner body panel element can be built up to provide for the attachment thereto of an outer body panel element at a more precisely determined location by attaching one or more metal shims to the surface of the inner body panel element to which the outer body element is to be attached, the number of such shims to be attached based on the original position of the inner body panel element. However, this is a time-consuming and expensive procedure, and the attachment of such shims adds to the weight of the vehicle, an undesirable feature especially since it detracts from fuel economy.

SUMMARY OF THE PRESENT INVENTION

According to the present invention there is provided a method of and apparatus for reforming a relatively imprecisely positioned element by a variable amount to present its surface or one or more selected portions thereof at a precisely determined position for the attachment of another element thereto, and the method and apparatus are particularly adapted for the reforming of a portion of an element of an automotive inner body panel to receive a metallic or plastic outer body panel to be attached thereto at a location which is more precisely determined than the original location of such inner body panel element. The apparatus of the present invention includes one or more fixed anvils which are moved into fixed positions on one side of the portion of the inner body panel element that is to be reformed, preferably on the outside thereof relative to the interior of the vehicle that is being produced. The apparatus also includes floating support attachments or surface locating members that are located on the same side of the inner body panel element as the fixed anvils and which move, relative to the fixed anvils, toward and away from the adjacent portion of the surface of the inner body panel element that is to be reformed. The floating support attachment members are located on floating arms on the same side of the inner body panel as the fixed anvils and are actuated toward the surface of the inner body panel element until they make contact therewith to "find" the location of the inner body panel, at which time they are locked in a fixed position, preferably hydraulically, until the reforming cycle is completed.

The apparatus of the present invention also includes a movable ram that is located on the opposite side of the inner body panel element being reformed. The movable ram is movable toward and away from such opposite side of the inner body panel element and has pad forming blocks contacting the surface of the inner body panel that are positioned opposite the fixed anvils. After the floating arms have been brought into contact with the surface of the inner body panel element that is to be reformed and have been locked in position, the movable ram is actuated to move toward the inner body panel element and to reform the portions thereof that are trapped between the fixed anvils and the pad forming blocks of the movable ram. Thus, the inner body panel element will be provided with one or more pads, the outside surface of each of which corresponds in position to the fixed position of the fixed anvil against which it is formed, regardless of the original position of the inner body panel element from which it is formed, the depth of each of such pads varying, therefore, according to the difference between the fixed position of its outer surface and the original position of the portion of the outer surface of the inner body panel element from which it is formed. Each of such pads is ready for the attachment of an outer body panel element thereto without any further machining or other processing being required to establish its fixed location. The only additional processing normally being required is the lancing, punching, or piercing of an aperture in such pad to receive a fastener for the fastening of the outer body panel element thereto, which lancing, punching, or piercing, if required or desired, most conveniently being done during the forming of the pad by a tool which reciprocates within the fixed anvils. The method and apparatus of the present invention can be used to prepare an automotive inner body panel for the attachment of sheet metal or plastic outer body panels to the inner body panels, according to the preferences of the vehicle manufactures.

Therefore, it is an object of the present invention to provide a method of an apparatus for reforming a relatively imprecisely located element to present a surface thereof at a precise location for the attachment of another element thereto.

More particularly, it is an object of the present invention to provide a method of and apparatus for reforming an element of an automotive inner body panel to present a portion of the surface of such element at a predetermined position for the attachment of an outer body panel thereto.

It is a further object of the present invention to provide a method of and apparatus for reforming a relatively imprecisely located element to present a surface thereof at a precise location for the attachment of another element thereto and for forming a hole in such surface to facilitate the attachment of the outer element thereto.

More particularly, it is a further object of the present invention to provide a method of and apparatus for reforming an element of an automotive inner body panel to present a portion of the surface of such element at a predetermined position for the attachment of another element thereto and for forming a hole in such surface to facilitate the attachment of the element thereto.

For a further understanding of the present invention and the objects thereof, attention is directed to the drawings and the following brief description thereof, to the description of the preferred embodiment of the invention and to the claims.

DETAILED DESCRIPTION OF THE PREFERRED EMBODIMENT

Figure 1:
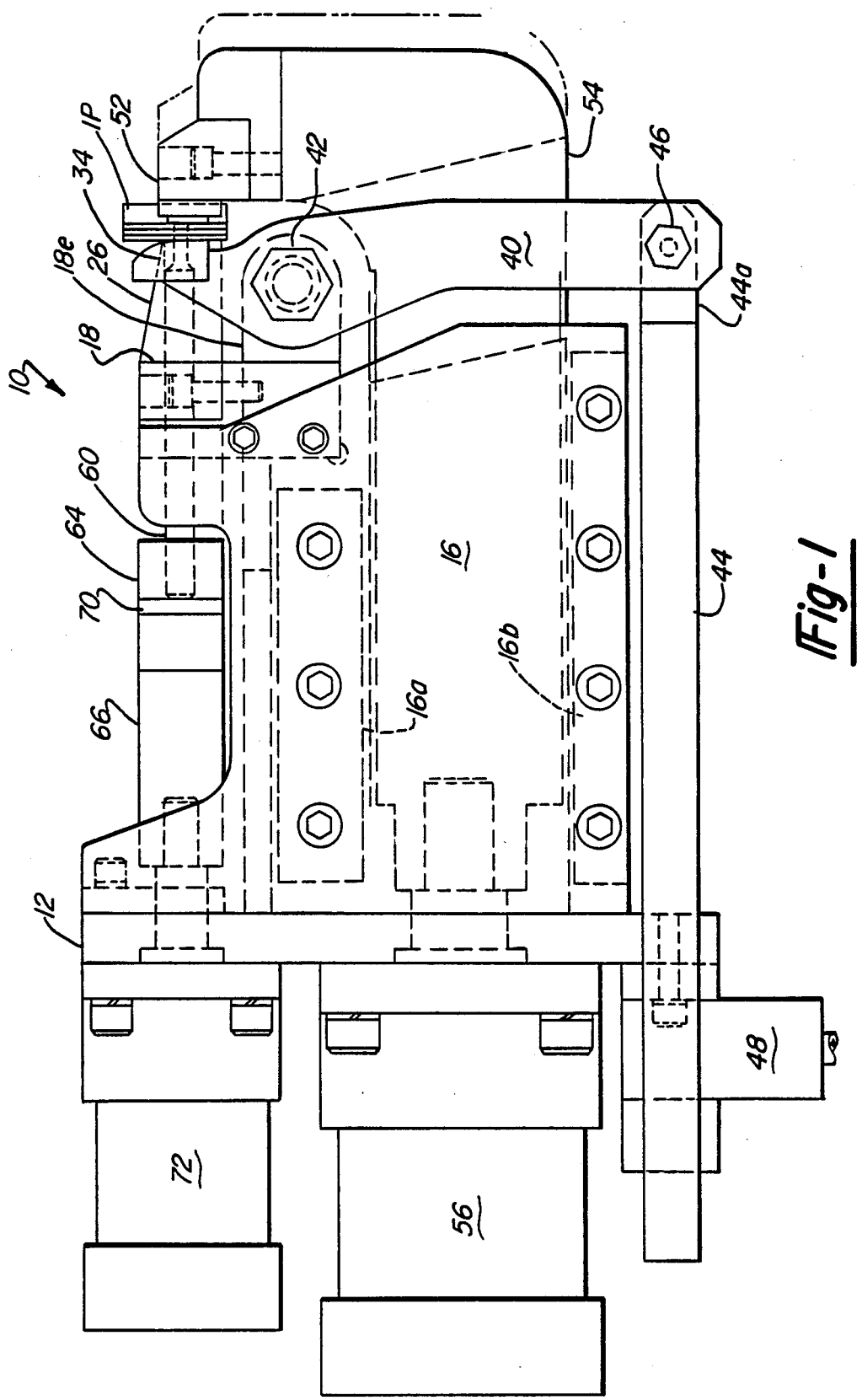
FIG. 1 is an elevational view of a preferred embodiment of the apparatus according to the present invention.

According to the present invention there is proivded a net locating device in the form of a pad forming device that is generally indicated by reference numeral 10 with reference to the Figures. The pad forming device 10 is movable, in unison, into and away from working engagement with a portion of an automotive inner body panel, indicated generally by reference character IP, at a work station where the central X, Y, and Z axes of such inner body panel, which is usually in the form of a skeleton of the vehicle that is to be formed therefrom, are precisely positioned relative to one or more of the pad forming devices 10, in a suitable fixture, not shown, which is known in the art.

Figure 6:
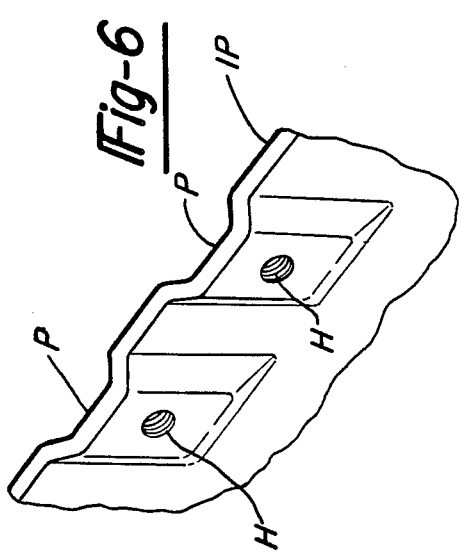
FIG. 6 is a fragmentary perspective view showing a portion of an automotive inner body element that has been processed by the apparatus according to FIGS. 1 through 3 and by the method according to FIGS. 4 and 5.
Figure 3:
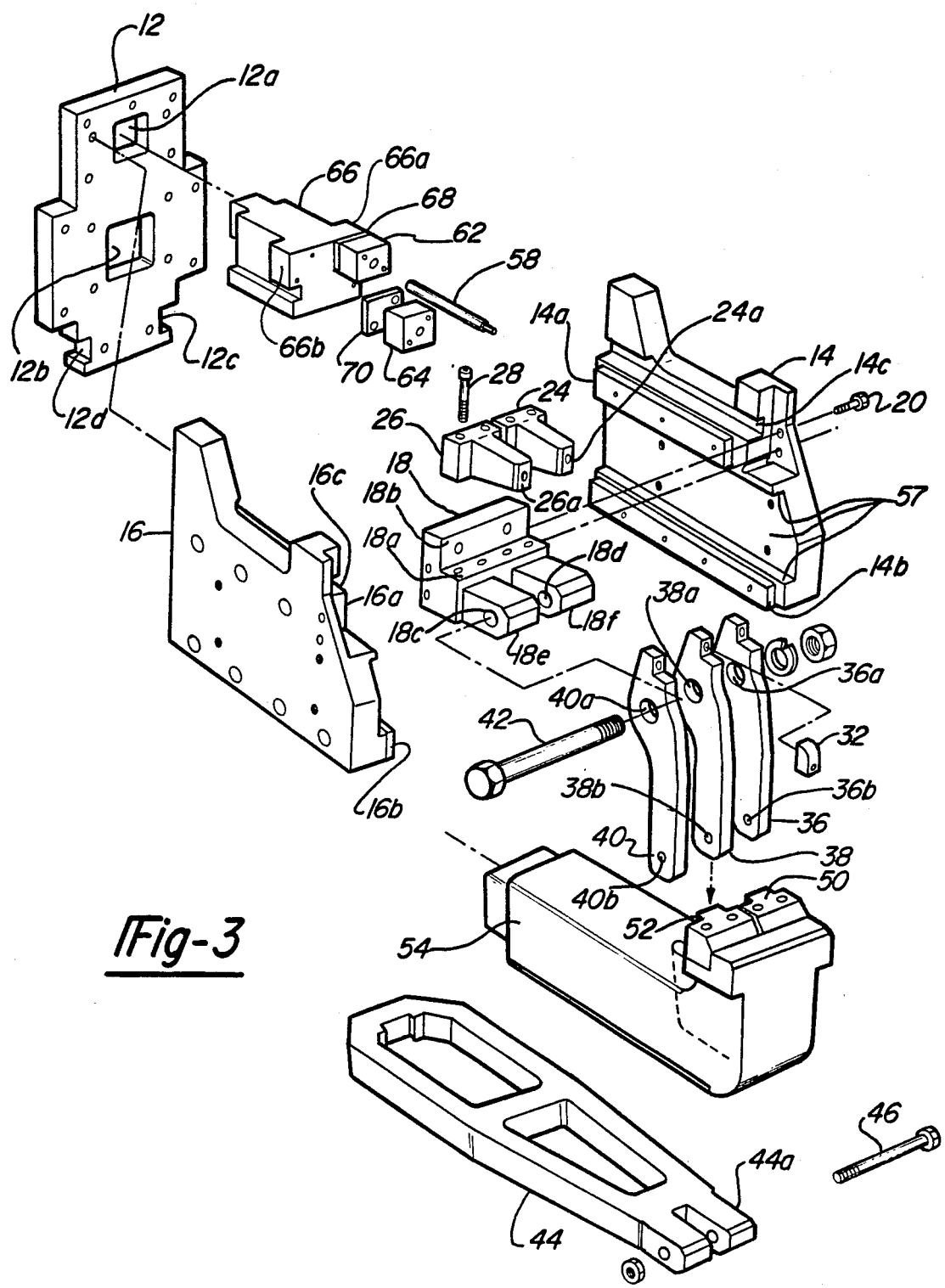
FIG. 3 is an exploded perspective view showing various of the elements of the apparatus that is shown in FIGS. 1 and 2.
Figure 4:
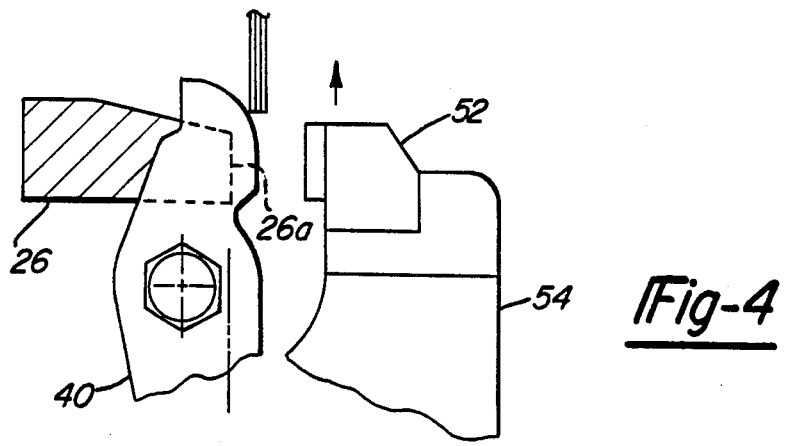
FIG. 4 is a fragmentary schematic view showing a step in the method of the present invention using the apparatus of FIGS. 1 through 3.
Figure 5:
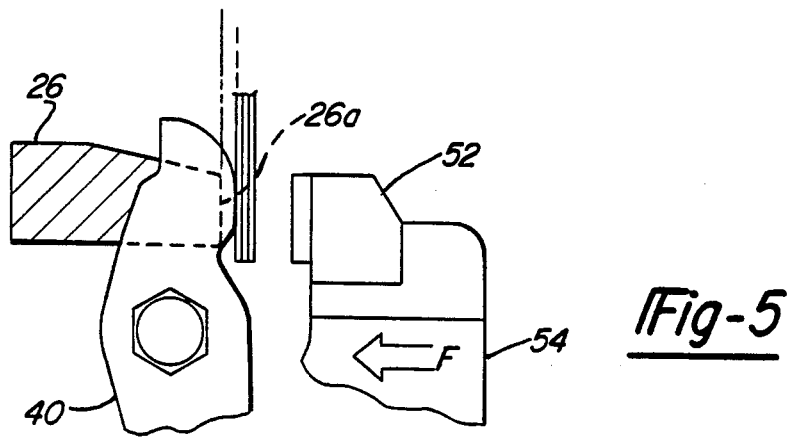
FIG. 5 is a view similar to FIG. 4 showing a subsequent step in the method of the present invention.

The structure of the pad device 10 is carried by a moounting plate 12 which is an element of such pad forming device and which, as shown in FIG. 3, is irregularly-shaped and is provided with a first aperture 12a and a second aperture 12b therein, for reasons which will be explained more fully herein. The pad forming device 10 is adapted to form a multiplicity, shown as two, of closely-spaced raised attachment pads in the inner body panel IP, such raised pads being generally identified by reference character P in FIG. 6. The pad forming device 10 also includes first and second spaced apart side plates 14 and 16, respectively, which are attached to the mounting plate 12 in any suitable manner, for example, by threaded fasteners, not shown, and which extend generally normally from the mounting plate 12, and generally parallel to one another, toward the inner body panel IP that is being processed.

Figure 2:
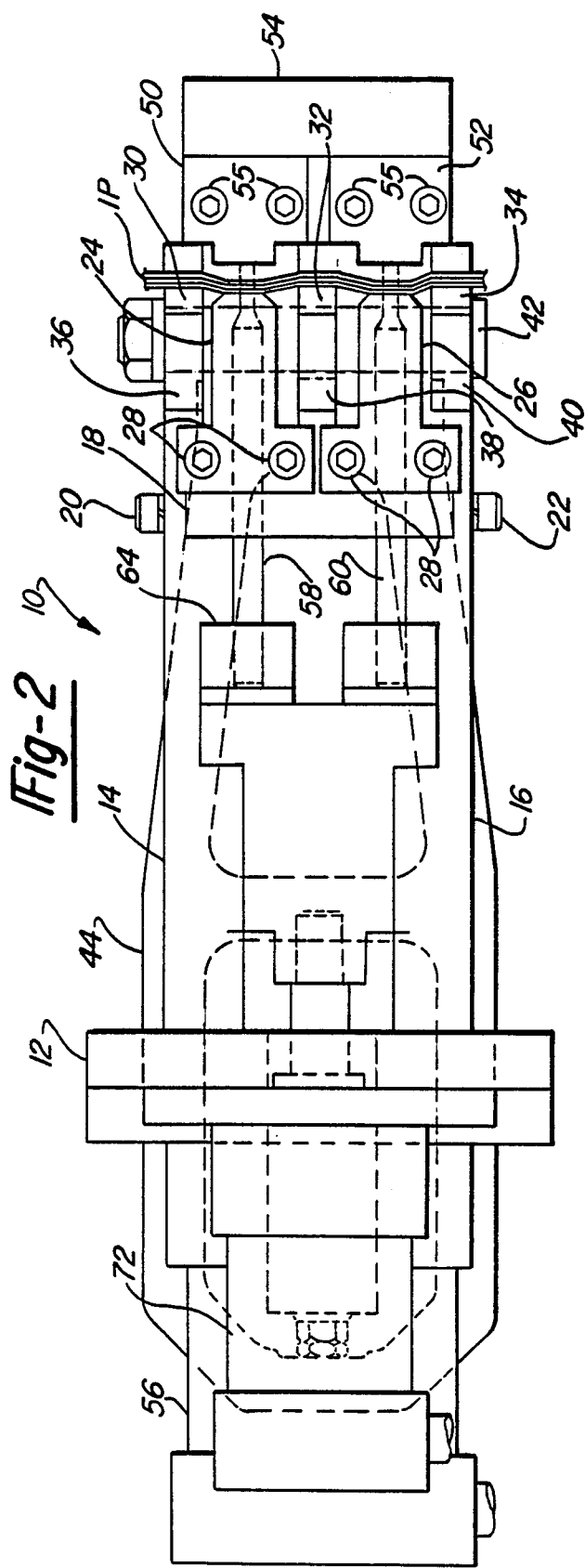
FIG. 2 is an plan view of the apparatus that is shown in FIG. 1.

A generally L-shaped mountng plate 18 extends across the space between the first side plate 14 and the second side plate 16 and the mounting plate 18 is secured to each of the first side plate 14 and the second side plate 16 in a suitable manner, for example, by cap screws including cap screws 20 and 22, as is shown in FIG. 2. For a two raised attachment pad forming device 10 of the type shown in the drawing and as heretofore described, first and second fixed anvils 24 and 26, of a known position, are attached to an intermediate horizontal surface 18a and a vertical surface 18b of the mounting plate 18, and are secured to the mounting plate 18 in a suitable manner, for example, by cap screws 28. The fixed anvils 24 and 26 have work contacting surfaces 24a and 26a, respectively, which, by the mechanism and the associated motion controls that are used to move the pad forming device 10 into working engagement with the inner body panel IP, which mechanism and controls, that is commonly referred to as a net locating device, precisely positions the X, Y, and Z axes of the work contacting surfaces 24a and 26a relative to the X, Y, and Z axes of the inner body panel. This precise location is preferably always at least some minimum fixed predetermined distance, for example, in this embodiment, at least approximately 1 mm away from the adjacent portions of the outer surface of the inner body panel IP in its outermost or maximum position. Thus, because there is typically a variance of approximately 4 to 5 mm in the final position of the outer surface of an inner body panel element, each of the work contacting surfaces 24a and 26a of the fixed anvils 24 and 26 will be spaced from 1 mm to approximately 5 mm from the adjacent portions of the outer surface of the inner body panel IP after such work contacting surfaces 24a and 26a have been brought into working engagement with the inner body panel IP.

The portions of the surface of the inner body panel IP that are adjacent the work contacting surfaces 24a and 26a are physically supported on both sides of each of the first and second fixed anvils 24 and 26 during the reforming of the inner body panel IP to produce the raised attachment pads P, regardless of the original spacing of the outer surface of the inner body panel IP from the work contacting surfaces by three floating support attachments 30, 32, and 34 which are attached at one end of each of three spaced-apart floating arms 36, 38 and 40 which are locked in a fixed position prior to reforming. The floating arms 36, 38, and 40 are pivotable about a common axis that extends through holes 36a, 38a, and 40a in the floating arms, respectively, such common axis being the central axis of a fixed pivot shaft 42 that extends through the holes 36a, 38a, and 40a, which are aligned with one another and through holes 18c and 18d in L-shaped mounting plate extensions 18e and 18f, respectively, that extend forwardly from the L-shaped mounting plate 18, the mounting plate extension 18e being positioned between the floating arms 38 and 40 and the mounting plate extension 18f being positioned between the floating arms 36 and 38.

The floating arms 36, 38, and 40 are provided with holes 36b, 38b, and 40b, respectively, which are spaced from the holes 36a, 38a, and 40a, respectively, and the rocking or oscillation of the floating arms 36, 38, and 40 about the central axis extending through the holes 36a, 38a, and 40a is caused by pivotally attaching the floating arms 36, 38, and 40 to a yoke portion 44a of a reciprocable draw yoke 44 by means of a floating pivot shaft 46 that extends through the holes 36b, 38b, and 40b of the floating arms 36, 38, and 40 and through the yoke portion 44a of the reciprocable draw yoke 44. As is clear from FIGS. 1 and 3 of the drawings, the pivot axis of each floating arm 36, 38, and 40 through the fixed pivot shaft 42 is much closer to the end of each such arm that carries the floating support attachments 30, 32, and 34, respectively, than it is to the end that carries the pivot axis through the floating pivot shaft 46. This relationship provides leverage which reduces the loadings on the reciprocable draw yoke 44 and it helps in the positioning of the floating support attachments 30, 32, and 34 against the inner body panel IP. The reciprocable draw yoke 44 reciprocates in guide notches 12c and 12d of the mounting plate 12, and the reciprocation is actuated by an hydraulic work support device 48 of a known type, i.e. Hytec Hydraulic Work Support No. 100231, a type of device which will lock the work contacting surfaces of the floating support attachments 30, 32, and 34 against the outer surface of the inner body panel IP once the floating arms 36, 38, and 40 have been wiped far enough toward the outer surface of the inner body panel IP to "find" the location of the inner body panel IP, that is, to bring the work contacting surfaces of the floating support attachments into contact with the inner body panel IP as shown in the preferred embodiment. Other known devices such as the type which open completely to receive the inner body panel IP and subsequently are allowed to float into contact with the inner body panel to "find" the location of the inner body panel IP are also intended to be used in the inventive pad forming device.

Once the floating support attachments 30, 32 and 34 have "found" the outer surface of the inner body panel IP and have been locked in position thereagainst, as heretofore described, the portions of the inner body panel IP between the floating support attachments 30, 32 and 34 are deformed outwardly until they make contact with the work contacting surfaces 24a and 26a of the first and second fixed anvils 24 and 26, respectively. This deforming is accomplished under a load that is imposed by spaced apart first and second pad forming blocks 50 and 52 that are attached in a spaced-apart relationship to a generally L-shaped hydraulically actuated ram 54. The pad forming blocks 50 and 52 are attached to the hydraulic ram 54 by cap screws 55. The hydraulic ram 54 is reciprocated between the broken line position shown in FIG. 1 and the solid line position shown in such Figure by an huydraulic cylinder 56 that is mounted to the back of the mounting plate 12 and is connected to the ram 54 through the aperture 12b. The reciprocation of the hydraulic ram 54 is guided by first, second, and third ways 57 that form the inside surface of the first and second side plates 14 and 16, and by are mounted in place by first and second spacer bars 14a, 14b, 16a, and 16b that are attached to the inside surface of the first and second side plates 14 and 16.

After the raised attachment pads P have been formed by the deforming of the inner body panel IP between the first and second pad forming blocks 50 and 52 and the first and second fixed anvils 24 and 26, as heretofore described, and before the extension of the hydraulic ram 54 to retract the pad forming blocks 50 and 52 from the inner body panel IP and the unlocking of the hydraulic work support guide 48 to retract the floating arms 36, 38, and 40 from the inner panel IP, to thereby permit the retraction of the pad forming device 10 from the inner body panel IP, it is frequently desirable to form an aperture in each of the raised attachment pads P by lancing an opening, punching a slug therefrom, or by the piercing thereof, to provide attachment apertures, such as punched-out holes H, in the raised attachment pads P for the subsequent attachment of an outer body panel to such raised attachment pads P. The lancing, punching, or piercing of the raised attachment pads P may be done most conveniently by the pad forming device 10, before it is withdrawn from the inner body panel IP. Thus, the pad forming device 10 is provided with lancing, piercing, or punching tools 58 and 60, the punching tools being affixed, respectively, to retainers 62 and 64 that, in turn, are affixed to a reciprocable hydraulic punching ram 66 with back-up plates 68 and 70, respectively, being mounted between the retainers 62 and 64 and the hydraulic punching ram 66. The hydraulic punching ram 66 is provided with outwardly projecting flanges 66a and 66b and the reciprocation of the punching ram 66 is guided by guides 14c and 16c in the first side plate 14 and the second side plate 16. The reciprocation of the punching ram 66 is hydraulically actuated by an hydraulic cylinder 72 that is attached to the back of the mounting plate 12, the connection between the hydraulic cylinder 72 and the punching ram 66 extending through the first aperture 12a in the mounting plate 12.

Figure 7:
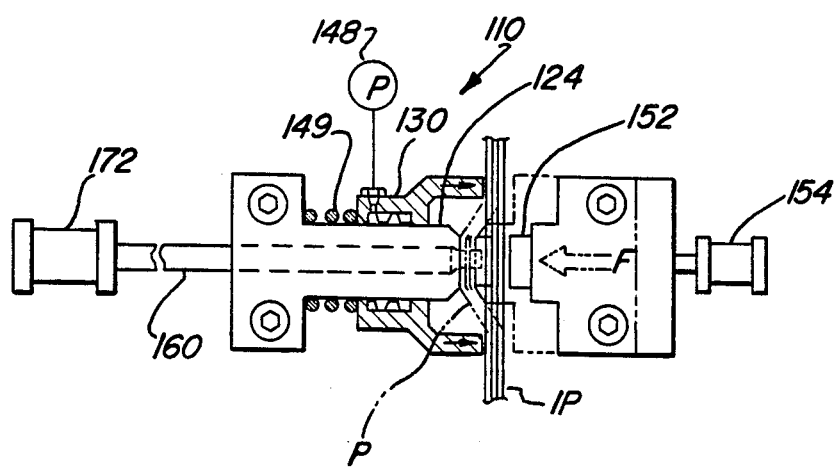
FIG. 7 is a fragmentary plan view of an alternative embodiment of the apparatus according to the present invention.

FIG. 7 illustrates the tooling portion of a pad forming device, generally identified by reference numeral 110, which is useful when it is only necessary to form a single raised attachment pad P in a given area of an inner body panel IP, as opposed to the pad forming device 10 of FIGS. 1 through 6, which is useful when it is necessary to form at least two closely-spaced raised attachment pads P in such inner body panel IP. In any case, the pad forming device carriers a fixed anvil 124 and an annular locating member 130 which is reciprocable with respect to the fixed anvil 124. The annular locating member 130 floats against the inner body panel IP to find same, whereafter the fixed anvil 124 is brought to a fixed position adjacent such inner body panel by a locating device, not shown. The floating movement of the annular locating member is assisted by a coil spring 149. After the annular locating member 130 has "found" or made contact with the adjacent surface of the inner body panel IP, it is hydraulically locked in place, as illustrated by reference character 148, and the form block 152 on the other side of the inner body panel IP, in general alignment with the fixed anvil 124, is driven hydraulically by a cylinder 154, shown schematically, toward the fixed anvil 124 to deform the portion of the inner body panel IP that is positioned between the fixed anvil 124 and the form block 152 to form a raised attachment pad P therein. The inner body panel IP is supported on each side of the portion that is being deformed by the hydraulically fixed annular locating member 130 to localize the deformation of the inner body panel IP that occurs when the form block 152 is urged thereagainst.

Again, as in the case of the pad forming device 10 of the embodiment of FIGS. 1 through 6, the pad forming device 110 of the embodiment of FIG. 7 may be provided with a punching tool 160 to punch or pierce a hole in the raised attachment pad P, after the raised attachment pad P has been formed in the inner body panel IP by the deforming thereof as heretofore explained. When the pad forming device is provided with such a punching tool 160, the fixed anvil 124 is constructed in an annular configuration and the punching tool 160 is reciprocably positioned within the annulus of the fixed anvil 124, the reciprocation of the punching tool 160 within the annulus of the fixed anvil 124 being hydraulically actuated by an hydraulic cylinder 172, shown schematically.

While the preferred embodiment of the invention has been disclosed, it will be apparent to those skilled in the art that changes may be made to the invention as set forth in the claims and, in some instances, certain features of the invention may be used to advantage without corresponding use of other features. Accordingly, it is intended that the illustrative and descriptive materials herein be used to illustrate the principles of the invention and not to limit the scope thereof. While the form of the embodiment of the invention herein disclosed constitutes a preferred form, it is to be understood that other forms might be adopted as may come within the scope of the claims which follow.

What is claimed is:

1. The method of reforming a relatively imprecisely positioned member having a first support surface and a second surface which is opposed to said first support surface to permit the attachment, at a more precisely determined position, of a second member to said first support surface of said imprecisely positioned member, said method comprising the steps of:
    positioning an anvil on a net locating apparatus at a predetermined fixed position;
    providing locating means on opposite sides of said anvil such as to straddle said anvil;
    advancing said locating means towards said imprecisely positioned member until said locating means comes into contact with said imprecisely positioned member;
    continue advancing said locating means towards said first support surface of said imprecisely positioned member, said net locating apparatus permitting said locating means to float with respect to said imprecisely positioned member during the continuing advancement of said locating means such that said locating means finds the location of said first support surface of said imprecisely positioned member;
    locking said locating means in position against said first support surface of said imprecisely positioned member; and
    imposing a load, through a pad forming block, adjacent said second surface of said imprecisely positioned member generally in alignment with said predetermined fixed positioned anvil to deform the portion of said imprecisely positioned member against said anvil while said portion is supported by said locating means, whereby said portion of said imprecisely positioned member is precisely positioned with respect to said predetermined fixed positioned anvil.

2. The method according to claim 1 and further comprising the step of piercing said precisely positioned portion of said imprecisely positioned member while said deformed portion of said imprecisely positioned member is between said anvil and said pad forming block.

3. The method according to claim 2 wherein said anvil is in the configuration of an annulus and wherein said step of piercing is performed by advancing a tool through said annulus of said anvil.

4. The method of reforming first and second spaced apart portions of a relatively imprecisely positioned member having a first support surface and a second surface which is opposed to said first support surface to permit the attachment, at a more precisely determined position, of at least one second member to said first support surface of said imprecisely positioned member, said method comprising the steps of:
    positioning a first anvil on a net locating apparatus at a first predetermined fixed position;
    positioning a second anvil on a net locating apparatus at a second predetermined fixed position adjacent said first anvil;
    providing first locating means between said first anvil and said second anvil;
    providing second and third locating means on opposing sides of said first locating means such that said first anvil is diposed between said first and second locating means and said second anvil is disposed between said first locating means and said third locating means;
    advancing said first locating means, said second locating means, and said third locating means simulataneously towards said imprecisely positioned member until said first locating means, said second locating means, and said third locating means come into contact with said imprecisely positioned member;
    continue advancing said first, second and third locating means towards said first support surface of said imprecisely positioned member, said net locating apparatus permitting said first, second and third locating means to float with respect to said imprecisely positioned member during the continuing advancement of said first, second and third locating means such that said first, second and third locating means finds the location of siad first support surface of said imprecisely positioned member;

locking said first locating means, said second locating means and said third locating means in position against said first support surface of said imprecisely positioned member;

imposing a first load, through a first pad forming block, against said second surface of said imprecisely positioned member generally in alignment with said first anvil to deform said first portion of said imprecisely positioned member against said first anvil while said first portion of said imprecisely positioned member is supported by said first locating means and one of said second locating means and said third locating means whereby said first portion of said imprecisely positioned member is precisely positioned with respect to said first predetermined fixed position of said first anvil; and simultaneous with said step of imposing said first load imposing a second load, through a second pad forming block, against said second surface of said imprecisely positioned member generally in alignment with said second anvil to deform said second portion of said imprecisely positioned member against said second anvil while said second portion of said imprecisely positioned member is supported by said first locating means and the other of said second locating means and said third locating means such that said second portion of said imprecisely positioned member is precisely positioned with respect to said second predetermined fixed position of said second anvil.

5. The method according to claim 4 and further comprising the steps of:

piercing said first portion of said imprecisely positioned member while said first portion of said imprecisely positioned member is between said first anvil and said first pad forming block; and simultaneous with said step of piercing said first portion piercing said second portion of said imprecisely positioned member while said second portion of said imprecisely positioned member is between said second anvil and said second pad forming block.

6. The method according to claim 5 wherein said first anvil is in the configuration of an annulus, wherein said second anvil is in configuration of an annulus, wherein said step of piercing said first portion of said imprecisely positioned member is performed by advancing a first tool through said annulus of said first anvil and wherein said step of piercing said second portion of said imprecisely positioned member is performed by advancing a second tool through said annulus of said second anvil.

7. The method of reforming a member that has first and second surfaces, said method comprising the steps of:

placing an anvil on a net locating apparatus at a first predetermined fixed position;

moving a floating support attachment, that is adjacent said anvil, into contact with said first surface of said imprecisely positioned member;

immobilizing the position of said anvil after said placing step;

locking said floating support attachment with respect to said anvil;

moving a pad forming block against said second surface to deform a portion of said imprecisely positioned member against said anvil while said portion is supported by said floating support attachment; and piercing the deformed portion of said imprecisely positioned member by advancing a tool in a direction toward said first surface while said deformed portion is immobilized between said pad forming block.

* * * * *

UNITED STATES PATENT AND TRADEMARK OFFICE
CERTIFICATE OF CORRECTION

PATENT NO. : 4,760,633

DATED : August 2, 1988

INVENTOR(S) : Ernest A. Dacey, Jr.

It is certified that error appears in the above-identified patent and that said Letters Patent is hereby corrected as shown below:

Column 1, line 41, after "determined" insert ---- position ----.

Column 3, line 30, delete "outer" and insert ---- other ----.

Column 4, line 4, delete "proivded" and insert ---- provided ----.

Column 4, line 17, after "pad" insert ---- forming ----.

Column 4, line 18, delete "moounting" and insert ---- mounting ----.

Column 4, line 34, delete "mountng" and insert ---- mounting ----.

Column 6, line 14, delete "huydraulic" and insert ---- hydraulic ----.

Column 6, line 68, delete "carriers" and insert ---- carries ----.

UNITED STATES PATENT AND TRADEMARK OFFICE
CERTIFICATE OF CORRECTION

PATENT NO. : 4,760,633
DATED : August 2, 1988
INVENTOR(S) : Ernest A. Dacey, Jr.

Sheet 2 of 2

It is certified that error appears in the above-identified patent and that said Letters Patent is hereby corrected as shown below:

In the Claims

Column 9, line 1, delete "siad" and insert ---- said ----.

Column 10, line 36, before "pad" insert ---- anvil and said ----.

Signed and Sealed this

Eighteenth Day of April, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,760,633
DATED : August 2, 1988
INVENTOR(S) : Ernest A. Dacey, Jr.

It is certified that error appears in the above-indentified patent and that said Letters Patent is hereby corrected as shown below:

Claim 7, line 1 (at Column 10, line 16), delete "a member" insert ---- an imprecisely positioned member ----.

Signed and Sealed this

Twentieth Day of February, 1996

Attest:

BRUCE LEHMAN

Attesting Officer

Commissioner of Patents and Trademarks